(No Model.)
H. M. BRITTAIN.
INHALER.
No. 440,132. Patented Nov. 11, 1890.
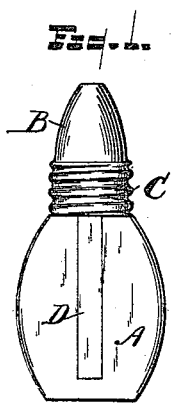
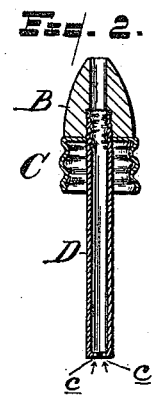
WITNESSES
INVENTOR
Howard M. Brittain
by H. F. Eberts
Attorney.

UNITED STATES PATENT OFFICE.

HOWARD M. BRITTAIN, OF MARTIN'S CREEK, PENNSYLVANIA.

INHALER.

SPECIFICATION forming part of Letters Patent No. 440,132, dated November 11, 1890.

Application filed August 12, 1890. Serial No. 361,820. (No model.)

*To all whom it may concern:*

Be it known that I, HOWARD M. BRITTAIN, of Martin's Creek, in the county of Northampton and State of Pennsylvania, have invented new and useful Improvements in Inhalers; and I hereby declare that the following is a full, clear, and exact description thereof, reference being had to the accompanying drawings, which form a part of this specification.

This invention relates to that class of instruments known as "pocket-inhalers," for containing menthol or other crystallized volatile medicaments which are administered by inspiration, either through the mouth or nose.

The object of my invention is to furnish a small, compact, and cheap inhaler, ready for use by loosening the screw-cap, which forms part of the nozzle. A reverse movement tightly closes the receptacle.

My invention consists in the novel and peculiar construction of the nozzle, which has a female-threaded base for screwing onto and closing the mouth of the flask or container, and a central pendent tube extending nearly to the bottom of the container, whereby the air inhaled through the same will be compelled to pass through the mass of the medicament, and thus be more thoroughly charged with its volatile properties.

Figure 1 is an elevation. Fig. 2 is a vertical section of the cap and tube. Fig. 3 is an inverted bottom plan of the cap and tube.

In the drawings, A is a small flask-shaped glass vessel, molded with a screw-top adapted to receive a threaded spun-metal ring C, whose upper edge is tightly flanged into a groove at the base of a conical wooden nozzle B, which may be japanned or lacquered.

Fitted permanently into the lower end of the nozzle-bore is a metallic tube D, closed at its lower end except for the perforations $c$, which serve as a strainer to retain the crystals in the flask, the tube extending nearly to its bottom. By loosening the cap a half-turn and inhaling at the nozzle, air will enter under the cap into the top of the flask and pass down through the body of the contained medicament, whose volatile properties charge it before passing into the user's system. A half-turn to the right brings the base of the wooden nozzle firmly against the top of the flask-neck and thus prevents loss by evaporation.

What I claim as my invention is—

In an inhaler, a nozzle having a tube extending into the container and a screw-cap forming the base of said nozzle, in combination with a container having a screw-threaded neck, substantially as described.

HOWARD M. BRITTAIN.

Witnesses:
    JOHN R. HEIL,
    GEO. F. KICHLINE.